(12) United States Patent
Ren et al.

(10) Patent No.: US 9,050,558 B2
(45) Date of Patent: Jun. 9, 2015

(54) BIOTRICKLING FILTER FOR TREATING WASTE GAS AND TREATING METHOD USING THE SAME

(76) Inventors: Hongqiang Ren, Nanjing (CN);
Yonggang Wu, Nanjing (CN); Lili Ding, Nanjing (CN)

( * ) Notice: Subject to any disclaimer, the term of this patent is extended or adjusted under 35 U.S.C. 154(b) by 418 days.

(21) Appl. No.: 13/457,465

(22) Filed: Apr. 26, 2012

(65) Prior Publication Data

US 2012/0208262 A1 Aug. 16, 2012

Related U.S. Application Data

(63) Continuation-in-part of application No. PCT/CN2010/079773, filed on Dec. 14, 2010.

(30) Foreign Application Priority Data

Dec. 31, 2009 (CN) .......................... 2009 1 0264232

(51) Int. Cl.
*C12M 1/14* (2006.01)
*B01D 53/84* (2006.01)
*B01D 53/18* (2006.01)

(52) U.S. Cl.
CPC ................. *B01D 53/84* (2013.01); *B01D 53/18* (2013.01); *B01D 2257/2064* (2013.01); *B01D 2257/304* (2013.01); *B01D 2257/406* (2013.01); *B01D 2257/70* (2013.01); *B01D 2257/7027* (2013.01); *B01D 2257/708* (2013.01)

(58) Field of Classification Search
CPC ........ C12M 25/06; C12M 27/14; C12M 1/40; C12M 27/02; C12M 35/04; C12M 21/04; C12M 23/14; C12M 29/10; B01D 53/85; B01D 53/84; B01D 53/18; B01D 2257/2064; B01D 2257/304; B01D 2257/406; B01D 2257/70; B01D 2257/7027; B01D 2257/708
USPC ............................................ 435/289.1, 299.1
See application file for complete search history.

(56) References Cited

U.S. PATENT DOCUMENTS 6,100,081 A * 8/2000 Buelna ........................ 435/295.3
2008/0096268 A1* 4/2008 Herner et al. .................. 435/266

FOREIGN PATENT DOCUMENTS

| CN | 2768882 | * | 4/2006 |
| DE | 3205452 | * | 10/1983 |
| GB | 2336361 | * | 10/1999 |

OTHER PUBLICATIONS

Machine Translation of DE3205452 (Oct. 1983).*
Machine translation of CN 2768882 (Apr. 2006).*

* cited by examiner

*Primary Examiner* — Nathan Bowers
*Assistant Examiner* — Timothy Barlow
(74) *Attorney, Agent, or Firm* — Matthias Scholl P.C.; Matthias Scholl

(57) ABSTRACT

A biotrickling filter for treating waste gas including a waste gas inlet, packing layers, a spray pipe, a spray liquid storage tank, and a waste gas outlet. The waste gas passes through a first packing layer after passing through the waste gas inlet and then passes through a second packing layer after changing the flow direction at the bottom of the first packing layer; the flow directions of the waste gas in the first packing layer and the second packing layer are opposite to form a cross-flow structure; the two different flow directions of the waste gas form a cross-flow unit, and two or more cross-flow units form the biotrickling filter.

3 Claims, 1 Drawing Sheet

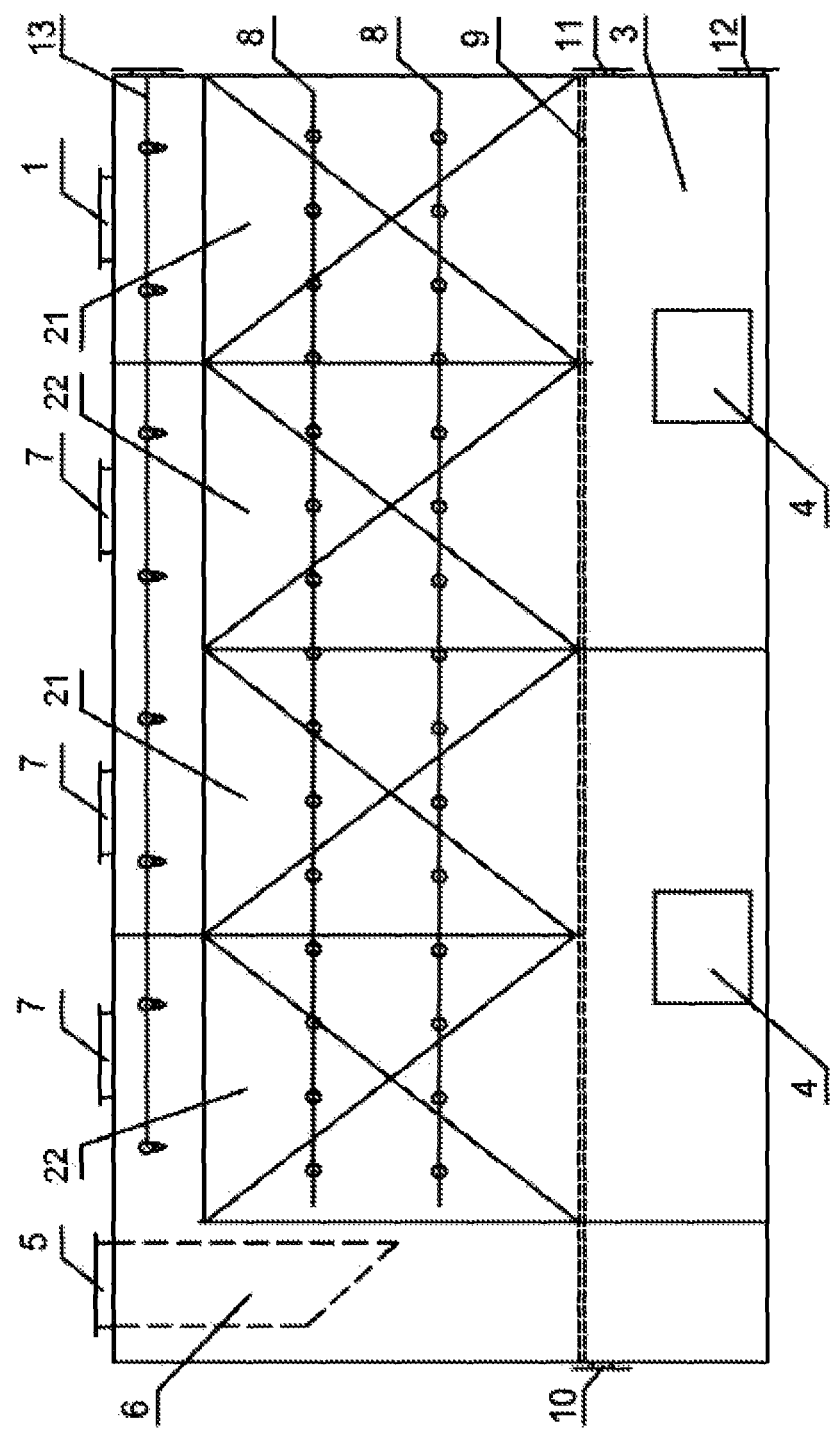

BIOTRICKLING FILTER FOR TREATING WASTE GAS AND TREATING METHOD USING THE SAME

CROSS-REFERENCE TO RELATED APPLICATIONS

This application is a continuation-in-part of International Patent Application No. PCT/CN2010/079773 with an international filing date of Dec. 14, 2010, designating the United States, now pending, and further claims priority benefits to Chinese Patent Application No. 200910264232.7 filed Dec. 31, 2009. The contents of all of the aforementioned applications, including any intervening amendments thereto, are incorporated herein by reference.

BACKGROUND OF THE INVENTION

1. Field of the Invention

The invention relates to a waste gas treating device and a treating method using the same, and more particularly to a cross-flow biotrickling filter for treating waste gas and a treating method using the same.

2. Description of the Related Art

Biological waste gas purification technology is a major technology in the development of waste gas purification technology due to the advantages of mild operating conditions, low investment and operational costs as well as non-secondary pollution. A biotrickling filter is generally defined as a bioreactor, in which inert packing materials are partially or completely used to remove odorant pollutants in the air by means of manual inoculation of microorganism and continuous or intermittent spraying. Such a bioreactor has been considered to be a new generation of device for waste gas treatment owing to its advantages of wide applicable scope, high treatment load, and long service life.

The reactor construction of a biotrickling filter has an important influence on the reactor's applicable scope and performance; hence it is the first factor to be taken into account in its design. At present, most of the biotrickling filters under study and applications are solely of gas-liquid contact type, more specifically, it is either parallel-flow type or counter-flow type. A few of drum type and transverse-flow type biotrickling filters are used for laboratory research. However, in actual waste gas treatment site, pollutant gases contain complicated composition, especially in pharmaceutical factories, where the pollutant gases are composed of dozens of pollutants and the pollutants have completely different concentrations and physicochemical properties (e.g. water solubility, biodegradability and odour thresholds). As to the biotrickling filters of single gas-liquid contact type, it is difficult to achieve an ideal treatment effect on the waste gas, having multiple components, high concentration differences or having large differences as to physicochemical properties of those components.

Conventional biotrickling filters adopts a counter-flow structure or a drum structure to remove nitrogen oxides or odour produced, with a poor treatment effect.

SUMMARY OF THE INVENTION

In view of the unsatisfactory treatment effect of a biotrickling filter, in accordance with the prior art, to treat waste gas having multiple components, high concentration differences, or large differences as to physicochemical properties of those components, there provided is a biotrickling filter for treating waste gas and a treating method using the same with a cross-flow packing bed employed. It is capable of efficiently removing pollutant gases with complex components or with different physicochemical properties in a single reactor at the same time.

To achieve the above objective, in accordance with one embodiment of the invention, there is provided a biotrickling filter for treating waste gas comprising a waste gas inlet, packing layers, a spray pipe, a spray liquid storage tank, and a waste gas outlet, wherein the waste gas passes through a first packing layer after passing through the waste gas inlet and then passes through a second packing layer after changing the flow direction at the bottom of the first packing layer; the flow directions of the waste gas in the first packing layer and the second packing layer are opposite to form a cross-flow structure; the two different flow directions of the waste gas form a cross-flow unit, and two or more cross-flow units form the biotrickling filter.

In a class of this embodiment, the biotrickling filter is either in the construction of a rectangle or a circle with a plurality of partitions divided internally. The number of the partitions is determined by the composition, flow rate, and temperature of the waste gas and the number is generally more than two. The height of the packing materials in each partition is determined by the installation site conditions and waste gas components and the height is generally over 1.5 m. Such a construction can be made into an independent module, or uses a single module or the combination of multiple modules. The partitions arranged in the packing layers enable the waste gas entering the biotrickling filter to contact the packing materials in a cross-flow manner.

In a class of this embodiment, the upper portion of the packing layers is arranged with a spray system comprising several non-clogging spray heads, which are made of corrosion resistant materials such as ceramic materials, stainless steel, and graphite. The spray heads are evenly distributed along the section of the entire reactor according to the effective coverage area of each spray head. A multi-layered spray pipes can be laid in the packing layers according to actual needs. If the pressure drop increases because of the accumulation of metabolites and surplus biomass in a reactor, the reactor can be eluted.

In a class of this embodiment, the spray liquid storage tank, arranged at the lower portion of the packing layers and the bottom of the reactor, can be combined with the reactor to form an entire device or used as an individual part.

Packing materials and packing methods: different packing materials can be used such as granular activated carbon, annular or globular polyethylene, isocyanurate foam, and ceramsite, but inert packing materials are most common. The packing materials will not be degraded by microorganism in a reactor as they are corrosion resistant to some degree and the size of the packing materials is determined by the components and flow rate of the waste gas. On specific occasions, two or more of the foregoing packing materials can be mixed together to improve mass transfer effects. Additionally, the packing materials with different sizes can be added in different layers, generally with larger ones at the waste gas inlet and smaller ones at the waste gas outlet. The gas-liquid ratio of the spray is 100-600, where the upper limit or lower limit is selected or adopted when the main pollutants in the waste gas are hydrophilic or hydrophobic, respectively.

A method for treating waste gas using a biotrickling filter comprises the following steps:
  (1) introducing waste gas into the biotrickling filter via a waste gas inlet;
  (2) purifying the waste gas through a cross-flow packing layer;

(3) discharging purified waste gas from the biotrickling filter via a demister;
(4) spraying on the packing layer via spray heads arranged on the top of the biotrickling filter; and
(5) washing the packing layer by washing pipes arranged inside the packing layer.

Advantages of the invention are summarized below:

A biotrickling filter for treating waste gas and a treating method using the same, provided by the invention, are capable of effectively treating many pollutants with completely different properties and meanwhile has the following advantages:

(1) Applicable to Many Types of Waste Gas

It has excellent treatment effects on many types of waste gas generated from chemical plants, pharmaceutical factories, wastewater treatment plants, and food processing plants, including the pollutants with completely different properties such as hydrogen sulfide, ammonia, benzene, toluene, ethylbenzene, chlorobenzene, ethyl acetate, acetone, and ethanol. In industrial applications, the removal rate for all the foregoing pollutants is above 95%, thus the domestic emission standards are achieved or even exceeded.

(2) Backwash-Free

The metabolites and surplus biomass accumulated in the packing layer can be easily removed due to the spray system provided for the biotrickling filter; therefore, the packing layer need not to be washed back and a large amount of operating costs have been saved.

(3) Programmed Cultivation of Biofilm Formation on Packing Materials

A programmed cultivation method has been developed for biofilm formation on packing materials. It completely changes the way that the biotrickling filter requires a reactor to start up for biofilm formation on site. The biotrickling filter provided by the invention needs not to be started on site and biofilm formation process is completed when the device is in operation. In other words, the biotrickling filter, free of starting up, can be put into operation immediately after it is installed on site, thus the device reliability is improved, and working period and investment are reduced.

(4) Modularized and Intelligent Device

In consideration of the principles of the cost priority, convenient combination, and easy maintenance, a series of modules have been developed based on different pollutant gases and gas volume. In actual engineering applications, it is only necessary to implement and combine corresponding modules from the module library to design and produce the entire device. The device uses a highly intelligent monitoring system with a self-learning function for startup and stop, operation monitoring, data collection and communications, and the device needs not to be attended any more, therefore, its reliability is improved and it is more easy to use.

BRIEF DESCRIPTION OF THE DRAWINGS

The invention is described hereinbelow with reference to accompanying drawings, in which the sole figure is a structural representation of a biotrickling filter in accordance with the invention.

In the drawings, the following reference numbers are used: waste gas inlet 1, first packing layer 21, second packing layer 22, spray liquid storage tank 3, instrument panel 4, waste gas outlet 5, demister 6, inspection manholes 7, washing pipes 8, packing material support plate 9, water supply vent 10, sampling port 11, discharge vent 12, and spray pipe 13.

DETAILED DESCRIPTION OF THE EMBODIMENTS

The invention is explained in further detail below with the reference to the attached drawings.

EXAMPLE 1

FIG. 1 shows a structural representation of a biotrickling filter for biological treatment of waste gas in accordance with the invention, in which the reactor is made of reinforced concrete, glass fiber reinforced plastics, carbon steel, stainless steel or other materials with appropriate strength and corrosion resistant properties.

The waste gas enters into the biotrickling filter from a waste gas inlet 1, which can be arranged at the top or bottom or in the middle of the biotrickling filter. The waste gas passes through a first packing layer 21 after passing through the waste gas inlet and then passes through a second packing layer 22 after changing the flow direction at the bottom of the first packing layer. Since a partition is arranged between the first packing layer and the second packing layer, the flow directions of the waste gas in the first packing layer and the second packing layer are opposite (as shown in FIG. 1) to form a cross-flow (reversal flow) structure; the two different flow directions of the waste gas form a cross-flow unit. As shown in FIG. 1, two cross-flow units form a reactor module. The biotrickling filter of the invention comprises a plurality of such modules in series or in parallel or combined together to form a larger reactor. The waste gas passing through the packing layers is finally discharged from a waste gas outlet 5 via a demister 6. In the reactor, a spray pipe 13, arranged at the top of the reactor, evenly sprays the liquid pumped from a spray liquid storage tank 3 onto the packing layers through non-clogging spray heads so as to provide necessary conditions for physicochemical and biological reactions in the packing layers or provide necessary nutrition. The packing layers are supported by a packing material support plate 9, the spray liquid storage tank 3 is arranged at the bottom of the reactor, and an instrument panel 4 is arranged with instruments necessary to monitor and control the reactor to achieve intelligent operation. When the operating time of the reactor increases, the spray liquid will be consumed, but it can be replenished through a water supply vent 10 when it reaches to a certain value. When the reactor requires overhaul, the spray liquid storage tank can be emptied via a discharge vent 12. When the reactor is accumulated with excessive metabolites and surplus biomass, the intelligent monitoring system will automatically open washing pipes 8 to wash the first packing layer 21 and the second packing layer 22 without stopping the reactor so as to maintain its normal operation. A sampling port 11 is arranged to monitor the operating status of the device for manual sampling.

EXAMPLE 2

The operation of the biotrickling filter used for biological treatment of waste gas is described below.

(1) Operating Conditions

In a wastewater treatment plant affiliated to some pharmaceutical factory, the waste gas treatment device has been running for 180 consecutive days.

Gas Composition: Actual Waste Gas
Reactor: 3 reactors with stainless housings are provided with the processing gas volume of 4,000 m³/h, 8,000 m³/h, and 12,000 m³/h. The reactor with the processing gas volume of 4,000 m³/h has a single module, the reactor with the one of 8,000 m³/h has two modules in parallel and the reactor with the one of 12,000 m³/h has three modules in parallel. The reactor with the processing gas volume of 4,000 m³/h has the dimensions of 8,000×2,500×4,000 (length×width×height: mm), wherein the volume of the packing layers and the spray liquid storage tank is 30 m³ and 25 m³, respectively.
Packing materials: high density polythene rasching rings are used with density of 940 kg/m³, diameter of 20-40 mm and height of 20-40 mm. Such a packing material is easy for biofilm formation and the packing method is a random pileup in an even manner.
(2) Operating Results

| No. | Pollutants | Inlet Concentration (mg/m³) | Outlet Concentration (mg/m³) | Remarks |
|---|---|---|---|---|
| 1 | Hydrogen sulfide | 120-5,100 | ≤0.05 | |
| 2 | Ammonia | 21-150 | Undetected | |
| 3 | Dichloromethane | 2-45 | ≤0.10 | |
| 4 | N-hexane | 1-15 | ≤0.01 | |
| 5 | Dimethylbenzene | 11-790 | ≤20 | |
| 6 | Toluene | 20-859 | ≤15 | |
| 7 | Ethanol | 25-510 | Undetected | |
| 8 | Acetone | 17-375 | Undetected | |

EXAMPLE 3

The operation of the biotrickling filter used for biological treatment of waste gas is described below.
1. Operating Conditions
In a workshop of some chemical plant, the waste gas treatment device has been running for 210 consecutive days.
Gas Composition: Actual Waste Gas
Reactor: 2 reactors made of glass fiber reinforced plastics are provided with the processing gas volume of 4,000 m³/h and 8,000 m³/h, respectively. The reactor with the processing gas volume of 4,000 m³/h has a single module and the reactor with the one of 8,000 m³/h has two modules in parallel. The reactor with the processing gas volume of 4,000 m³/h has the dimensions of 8,000×2,500×4,000 (length×width×height: mm), wherein the volume of the packing layers and the spray liquid storage tank is 30 m³ and 30 m³, respectively.
Packing materials: the mixture of high density polythene rasching rings and isocyanurate foam are used, in which the polythene rasching ring has the diameter of 20-40 mm and the height of 20-40 mm while the isocyanurate foam has the diameter of 50 mm. The packing method is a random pileup in an even manner.
2. Operating Results

| No. | Pollutants | Inlet Concentration (mg/m³) | Outlet Concentration (mg/m³) | Remarks |
|---|---|---|---|---|
| 1 | Ammonia | 50-550 | ≤0.5 | |
| 2 | Dimethylbenzene | 120-1,290 | ≤40 | |
| 3 | Toluene | 200-1,400 | ≤25 | |
| 4 | Ethanol | 500-5,000 | ≤55 | |

EXAMPLE 4

The operation of the biotrickling filter used for biological treatment of waste gas is described below.
1. Operation Conditions
In some food processing plant, the waste gas treatment device has been running for 371 consecutive days.
Gas Composition: Actual Waste Gas
Reactor: 2 reactors with housings made of PP plates are provided with the processing gas volume of 8,000 m³/h. The reactor with the processing gas volume of 8,000 m³/h has a single module and has the dimensions of 12,000×2,500×4,000 (length×width×height: mm), wherein the volume of the packing layers and the spray liquid storage tank is 40 m³ and 35 m³, respectively.
Packing materials: polyhedric hollow balls are used with diameters of 55 mm and density of 860 kg/m³. The packing height is 2,500 mm and the packing method is a random pileup in an even manner.
2. Operating Results

| No. | Pollutants | Inlet Concentration | Outlet Concentration | Remarks |
|---|---|---|---|---|
| 1 | Hydrogen sulfide | 15-575 | ≤0.05 | |
| 2 | Ammonia | 35-470 | ≤1.0 | |
| 3 | Trimethylamine | 1.5-55 | ≤0.05 | |
| 4 | Methyl mercaptan | 0.5-25 | Undetected | |
| 5 | Dimethyl sulfide | 0.2-15 | Undetected | |

The invention claimed is:
1. A biotrickling filter for treating waste gas, the biotrickling filter comprising:
a plurality of cross-flow units; each of the plurality of cross-flow units comprising an upper portion, a middle portion, a bottom portion, and a partition; the upper portion comprising a gas inlet and a gas outlet; the middle portion comprising a first packing layer and a second packing layer;
packing materials;
a packing material support plate;
a spray liquid storage tank;
a plurality of washing pipes;
a spray pipe;
a water supply vent;
a discharge vent; and
a sampling port;
wherein:
the gas outlet of one of the plurality of cross-flow units is connected to the gas inlet of another one of the plurality of cross-flow units, wherein the plurality of cross-flow units is connected in series to one another;
the gas inlet is connected to the first packing layer;
the gas outlet is connected to the second packing layer;
the partition is disposed in the upper portion and the middle portion and separates the first packing layer from the second packing layer;
the packing materials are arranged in the first packing layer and the second packing layer;
the plurality of washing pipes is disposed within the first packing layer and the second packing layer, and is oriented in a direction horizontal to a bottom surface of the biotrickling filter;
each of the plurality of washing pipes penetrates through the first packing layer and the second packing layer;
the bottom portion of each of the plurality of cross-flow units is connected to the spray liquid storage tank;

the packing material support plate is disposed between the spray liquid storage tank and the bottom portion of each of the plurality of cross-flow units;

the spray pipe is disposed in the upper portion of each of the plurality of cross-flow units; and the water supply vent, the discharge vent, and the sampling port are disposed on the spray liquid storage tank.

2. The biotrickling filter of claim 1, wherein the upper portion further comprises an inspection manhole.

3. The biotrickling filter of claim 1, wherein the packing materials are polyethylene raschig rings, a density of the packing materials is 940 kg/m$^3$, a diameter thereof is between 20 and 40 mm, and a height thereof is between 20 and 40 mm.

* * * * *